United States Patent
Lin et al.

(10) Patent No.: US 8,028,309 B2
(45) Date of Patent: Sep. 27, 2011

(54) OPTICAL READ/WRITE DEVICE

(75) Inventors: Hung-Ming Lin, Taipei Hsien (TW); Hao Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 800 days.

(21) Appl. No.: 12/056,294

(22) Filed: Mar. 27, 2008

(65) Prior Publication Data

US 2008/0244631 A1    Oct. 2, 2008

(30) Foreign Application Priority Data

Apr. 2, 2007 (CN) .......................... 2007 1 0200372

(51) Int. Cl.
*G11B 7/00* (2006.01)
(52) U.S. Cl. ......... 720/677; 720/659; 720/663; 720/676
(58) Field of Classification Search .................. 720/659, 720/663–665, 676–677, 679
See application file for complete search history.

(56) References Cited

U.S. PATENT DOCUMENTS

| | | | | |
|---|---|---|---|---|
| 6,058,098 A * | 5/2000 | Kato | | 720/663 |
| 6,657,943 B2 * | 12/2003 | Muto et al. | | 720/619 |
| 6,683,841 B2 * | 1/2004 | Lin | | 720/665 |
| 6,724,714 B1 * | 4/2004 | Kato et al. | | 720/672 |
| 6,922,841 B2 * | 7/2005 | Lee et al. | | 720/677 |
| 2003/0156528 A1 * | 8/2003 | Lee et al. | | 369/223 |
| 2003/0235139 A1 * | 12/2003 | Takeuchi | | 369/223 |
| 2004/0109403 A1 * | 6/2004 | Chen et al. | | 369/223 |
| 2004/0205795 A1 * | 10/2004 | Choi | | 720/679 |
| 2004/0255316 A1 * | 12/2004 | Ryu | | 720/672 |
| 2004/0268372 A1 | 12/2004 | Liu | | |
| 2005/0149960 A1 * | 7/2005 | Pu | | 720/664 |
| 2006/0080692 A1 * | 4/2006 | Yang et al. | | 720/676 |
| 2006/0161938 A1 * | 7/2006 | Bae et al. | | 720/663 |
| 2006/0212890 A1 * | 9/2006 | Miki et al. | | 720/676 |

FOREIGN PATENT DOCUMENTS

| | | |
|---|---|---|
| CN | 1444212 A | 9/2003 |
| JP | 2006344326 A | 12/2006 |
| KR | 20060067269 A | 6/2006 |

* cited by examiner

*Primary Examiner* — Daniell L Negron
*Assistant Examiner* — Carlos E Garcia
(74) *Attorney, Agent, or Firm* — Altis Law Group, Inc.

(57) ABSTRACT

According to one aspect, an optical read/write device for reading and/or writing an optical disk includes a rack disposed between the worm gear and the optical pickup head for transferring motion from the worm gear to the optical pickup head. The rack includes a fastening portion for fixing the rack to the optical pickup head, an engaging portion, a spring placed between the fastening portion and the engaging portion for pressing the engaging portion to engage with the worm gear, and a connecting portion. The connecting portion is configured for connecting the fastening portion and the engaging portion and preventing the engaging portion from disengaging from the worm gear.

13 Claims, 5 Drawing Sheets

OPTICAL READ/WRITE DEVICE

BACKGROUND

1. Field of the Invention

The present invention generally relates to optical read/write devices and, more particularly, to a mechanism for driving an optical pickup head of an optical read/write device.

2. Description of Related Art

In general, an optical pickup head records or reproduces information while moving across a recording data storage medium such as a disk. The optical pickup head includes a light source for emitting laser light and an objective lens for focusing the laser light to form an optical spot on the disk. As such, the optical pickup head is able to write or read information to or from the optical disk. The optical pickup head is driven by a driving mechanism to move along a path corresponding to a radial direction of the optical disk.

A conventional driving mechanism includes a motor, a worm gear connected to a rotor of the motor, and a gear portion attached to the optical pickup head. The gear portion engages the worm gear. The motor drives the worm gear to rotate and the gear portion is moved linearly by the worm gear. Thus the optical pickup head is moved linearly in the radial direction of the optical disk correspondingly.

However, the optical pickup head cannot be moved precisely because stress between the worm gear and the gear portion may cause the gear portion to disengage with the worm gear.

Therefore, a need exists for an optical read/write device resolving the above problem in the industry.

SUMMARY

According to one aspect, an optical read/write device for reading and/or writing an optical disk includes a rack disposed between the worm gear and the optical pickup head for transferring motion from the worm gear to the optical pickup head. The rack includes a fastening portion for fixing the rack to the optical pickup head, an engaging portion, a spring placed between the fastening portion and the engaging portion for pressing the engaging portion to engage with the worm gear, and a connecting portion. The connecting portion is configured for connecting the fastening portion and the engaging portion and preventing the engaging portion from disengaging from the worm gear.

Other systems, methods, features, and advantages of the present optical read/write device will be or become apparent to one with skill in the art upon examination of the following drawings and detailed description. It is intended that all such additional systems, methods, features, and advantages included within this description, be within the scope of the present device, and be protected by the accompanying claims.

BRIEF DESCRIPTION OF THE DRAWINGS

Many aspects of the present optical read/write device can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE EMBODIMENTS

Reference will now be made to the drawings to describe preferred embodiments of a present optical read/write device, in detail.

Figure 1:
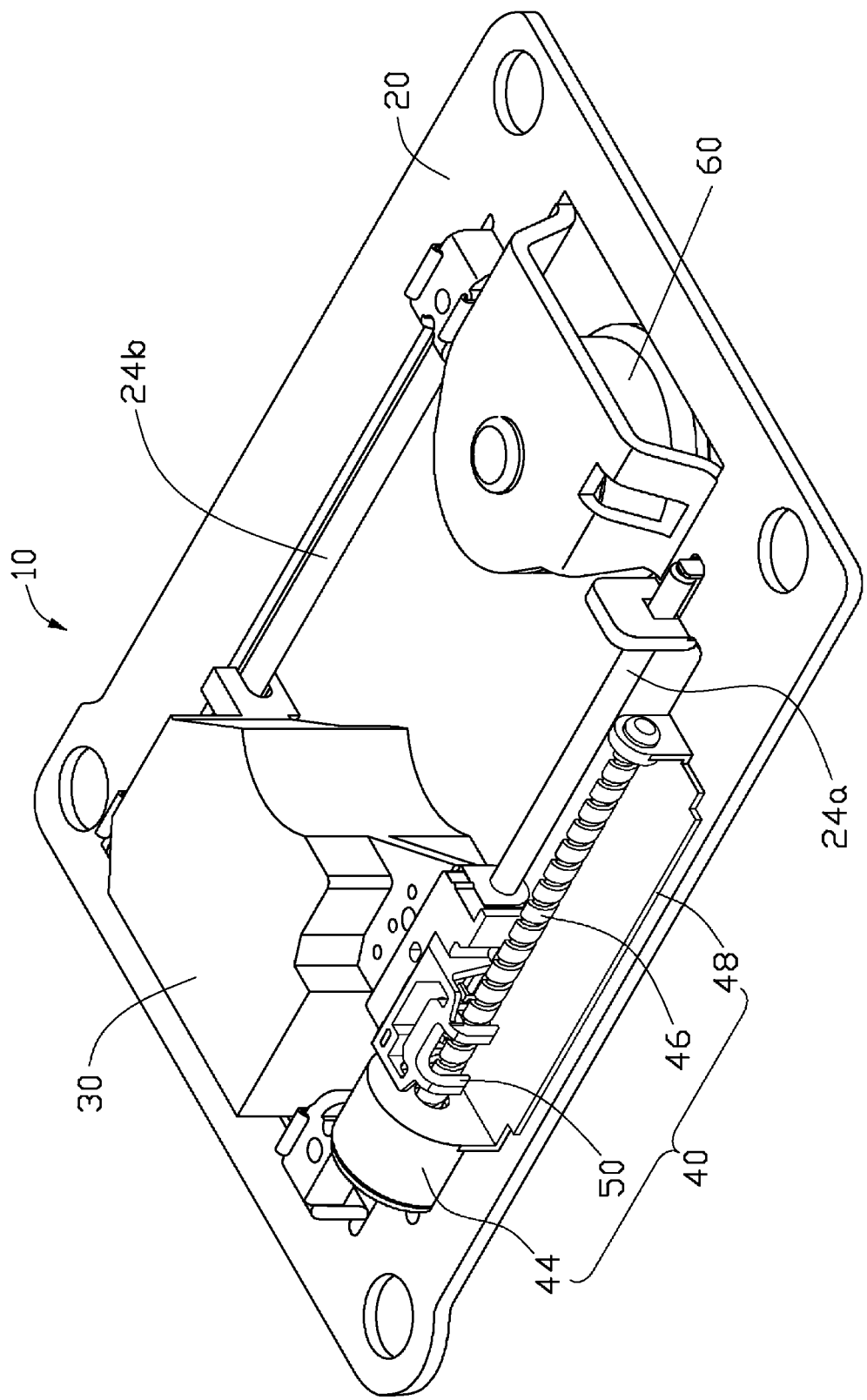
FIG. 1 is an isometric view of an optical read/write device in accordance with an exemplary embodiment.
Figure 2:
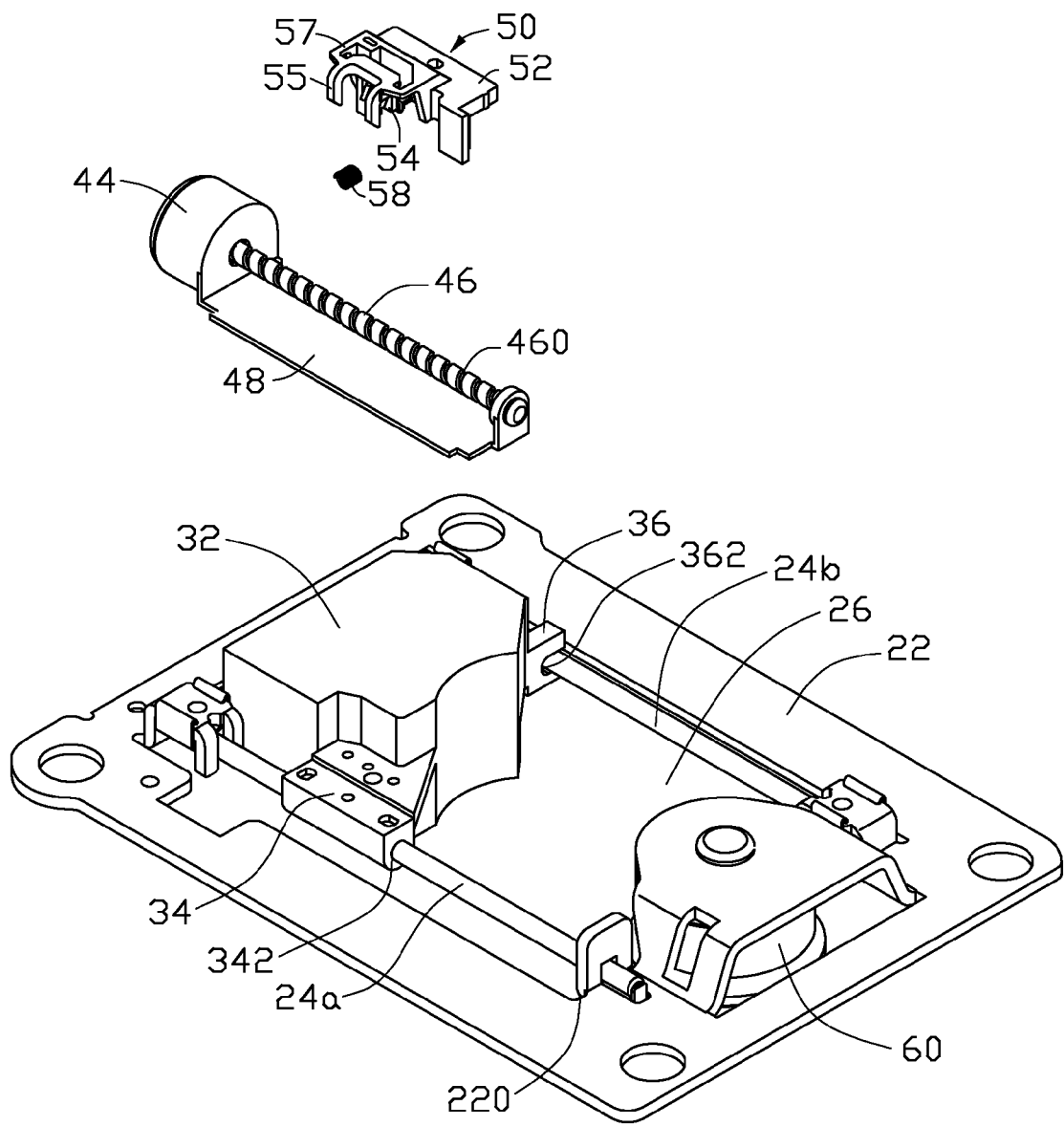
FIG. 2 is an exploded, isometric view of the optical read/write device of FIG. 1.

Referring to FIGS. 1 and 2, an optical read/write device 10 in accordance with an exemplary embodiment is illustrated. The optical read/write device 10 includes a base 20, an optical pickup head 30 slidably assembled on the base 20, a driving mechanism 40, and a spindle motor 60 mounted on the base 20.

The base 20 includes a chassis 22, a first guide member 24a, and a second guide member 24b. A center of the chassis 22 defines a substantially rectangular opening 26. The spindle motor 60 is mounted adjacent to a shorter side of the chassis 22 and configured for rotating an optical disk (not shown). The guide members 24a, 24b are correspondingly disposed on opposite longer sides of the chassis 22.

The optical pickup head 30 includes a main body 32 for housing optical lenses (not shown) etc. The optical pickup head 30 further includes a first projection portion 34 and a second projection portion 36 correspondingly formed at two lateral sides of the main body 32. The first projection portion 34 defines a guide hole 342 for slidably receiving the first guide member 24a. The second projection portion 36 defines a guide notch 362 for slidably receiving the second guide member 24b. The guide hole 342, the first guide member 24a, the guide notch 362, and the second guide member 24b are configured for allowing the optical pickup head 30 to be slidably assembled on the base 20.

The driving mechanism 40 includes a feed motor 44, a worm gear 46, a gear seat 48, and a rack 50.

The feed motor 44 is mounted on the chassis 22 at a same side of the first guide member 24a. The worm gear 46 is parallel to the first guide member 24a. An end of the worm gear 46 is connected to a rotor (not shown) of the feed motor 44, and another end of the worm gear 46 is supported by the gear seat 48. The surface of the worm gear 46 defines a thread 460.

Figure 3:
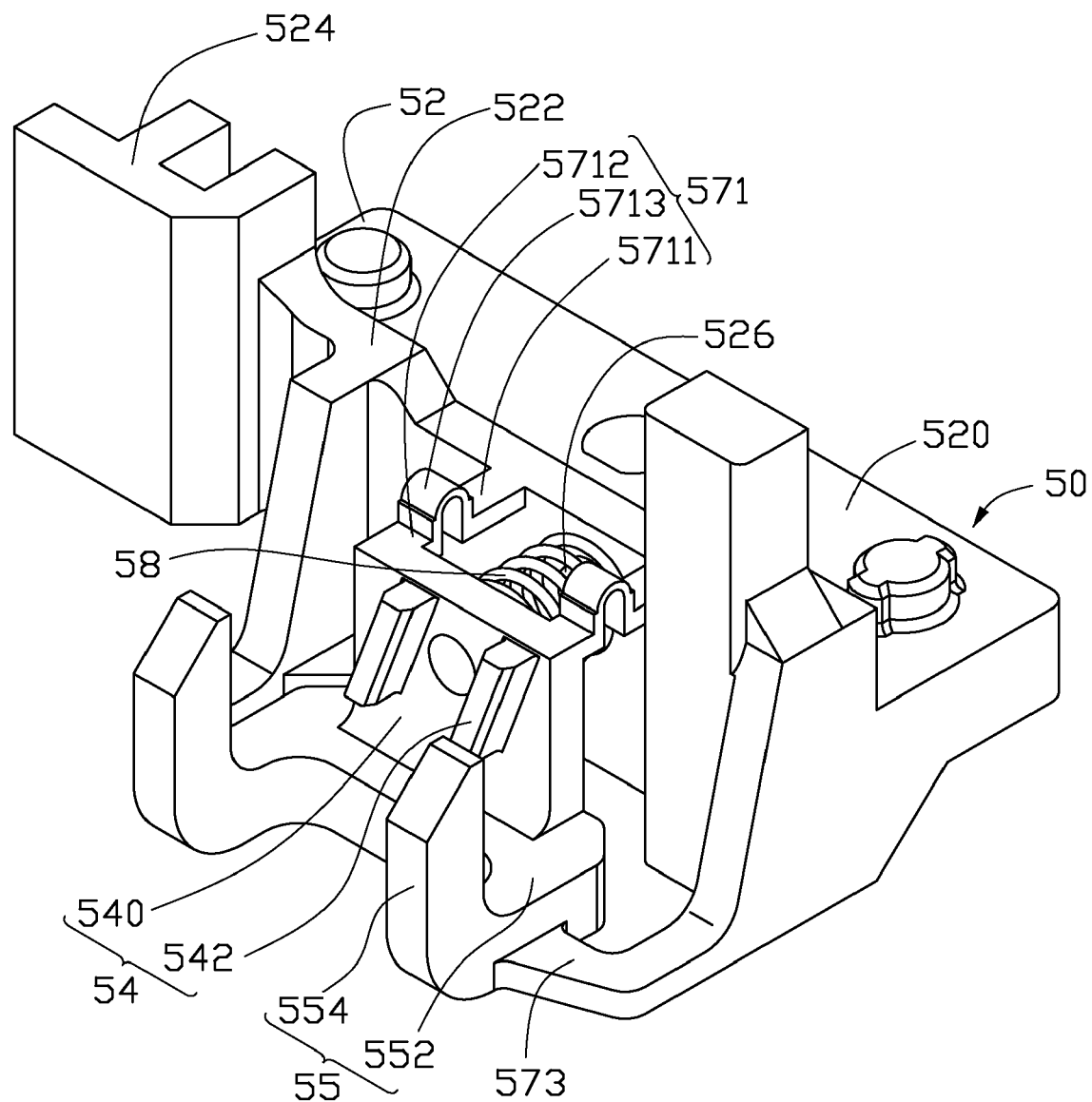
FIG. 3 is an enlarged, inverted isometric view of a rack in FIG. 1.

The rack 50 is connected to the optical pickup head 30 and engaged with the worm gear 46 for driving the optical pickup head 30 to move when the feed motor 44 rotates accordingly. Referring also to FIG. 3, the rack 50 includes a fastening portion 52 on one side of the rack 50, an engaging portion 54 on another side of the rack 50 opposite to the fastening portion 52, a connecting portion 57, a restricting portion 55, and a spring 58.

The fastening portion 52 includes a mounting plate 520, a base plate 522, and a block member 524. The mounting plate 520 is configured for fastening the rack 50 to the optical pickup head 30. The base plate 522 and the block member 524 perpendicularly extend from the mounting plate 520. A first cylindrical protrusion 526 is formed on the base plate 522 and protrudes toward the engaging portion 54. The block member 524 protrudes from the mounting plate 520 along a cylindrical axis of the worm gear 46. When the optical pickup head 30 is reading/writing information near a center portion of the optical disk, the block member 524 abuts an inner edge 220 adjacent to the spindle motor 60 of the chassis 22. Thus, the block member 524 prevents the main body 32 of the optical pickup head 30 from colliding with the spindle motor 60.

The engaging portion 54 includes an assembling plate 540, a pair of engaging teeth 542, and a second cylindrical protrusion (not shown). The engaging teeth 542 and the second cylindrical protrusion correspondingly protrude from two opposite sides of the assembling plate 540. The engaging teeth 542 are configured for meshing with the thread 460 of the worm gear 46, thus rotational motion of the worm gear 46 is converted to linear motion so as to drive the optical pickup head 30. The second cylindrical protrusion extends toward the first cylindrical protrusion 526. The second cylindrical protrusion and the first cylindrical protrusion 526 collectively define a gap therebetween. Ends of the spring 58 are sleeved on the first cylindrical protrusion 526 and the second cylindrical protrusion correspondingly. In order words, the spring is compressibly aligned between the assembling plate 540 and the base plate 522 via the first cylindrical protrusion 526 and the second cylindrical protrusion correspondingly.

The restricting portion 55 extends from the assembling plate 540 and is configured for preventing the engaging portion 54 from detaching out of the worm gear 46. The restricting portion 55 includes a junction member 552 and a grasping member 554. The junction member 552 perpendicularly connects the assembling plate 540 and the grasping member 554. Thus the assembling plate 540 is parallel to the grasping member 554. The assembling plate 540 and the grasping member 554 defines a gap therebetween for housing the worm gear 46. In this embodiment, the grasping member 554 includes two posts. In other embodiments, the grasping member 554 can be a flat plate parallel to the assembling plate 540.

The connecting portion 57 connects the fastening portion 52 and the engaging portion 54 and includes a shock absorber part 571 and a connecting arm 573 for connecting the fastening portion 52 and the junction member 552.

The shock absorber part 571 includes a first restricting arm 5711, a second restricting arm 5712, and an resilient member 5713. The first restricting arm 5711 perpendicularly extends from the base plate 522 toward the assembling plate 540. The second restricting arm 5712 perpendicularly extends from the assembling plate 540 opposite to the first restricting arm 5711. In this embodiment, the resilient member 5713 is a U-shaped arm with two ends of the U-shaped arm connecting free ends of the first restricting arm 5711 and the second restricting arm 5712 respectively. In other alternative embodiments, the resilient member 5713 can be a spring, an M-shaped, V-shaped, or W-shaped arm.

Referring to FIGS. 1 and 2, a detailed assembly procedure of the optical read/write device 10 will now be described. First, the spindle motor 60 is secured to the chassis 22. The guide members 24a, 24b respectively pass through the guide hole 342 and the guide notch 362 of the optical pickup head 30. Then the guide members 24a, 24b are respectively mounted on the two longer sides of the chassis 22. Thus, the optical pickup head 30 is slidably assembled on the base 20. The feed motor 44 and the gear seat 48 are mounted on the chassis 22 with the worm gear 46 being parallel and adjacent to the first guide member 24a.

The rack 50 is then connected to the optical pickup head 30. That is, the mounting plate 520 is fixed to the main body 32 of the optical pickup head 30. Thus, the rack 50 engages with the worm gear 46 in a manner that the worm gear 46 is received in the gap between the grasping member 554 and the assembling plate 540. Thus the engaging teeth 542 are meshed with the thread 460 of the worm gear 46 because the spring 58 pushes the assembling plate 540.

When the optical read/write device 10 reads data from or writes data onto the optical disk, the feed motor 44 drives the worm gear 46 to rotate. The rack 50 moves linearly because the engaging teeth 542 of the rack 50 mesh with the thread 460 of the worm gear 46. Accordingly, the optical pickup head 30 moves linearly because the rack 50 is fixed to the optical pickup head 30.

Referring to FIG. 3, when the pressure between the worm gear 46 and the engaging teeth 542 becomes too high that the engaging teeth 542 is about to detach from the thread 460, the engaging portion 54 is pushed toward the base plate 522. The resilient member 5713 is compressed accordingly. A maximum compressed length of the resilient member 5713 is determined by the depth of the thread 460. That is, the maximum length is configured to be less than or equal to the depth of the thread 460. Thus, a distance the engaging portion 54 is pushed toward the base is limited by the resilient member 5713, thus preventing the engaging teeth 542 from detaching out of the thread 460 when the pressure is too high.

Figure 4:
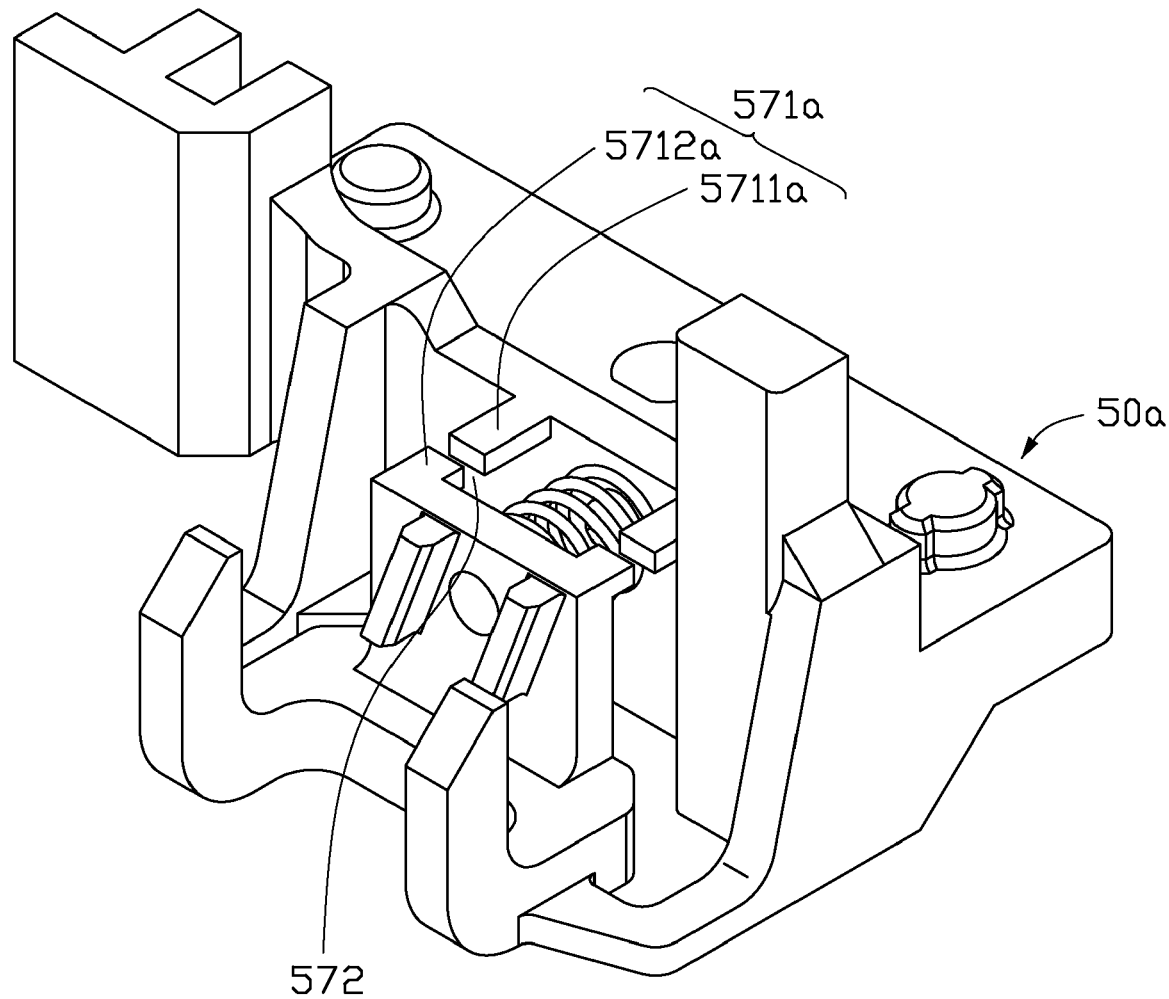
FIG. 4 is an enlarged, inverted isometric view of the rack in accordance with a second embodiment.

Referring to FIG. 4, a second embodiment of a rack 50a is illustrated. Comparing to the rack 50 in FIG. 3, the first restricting arm 5711a and the second restricting arm 5712a of the shock absorber part 571a are spaced apart by a deviation gap 572. When the engaging portion 54 is pushed toward the base plate 522 and deviates to a predetermined distance, the second restricting arm 5712a will collide with the first restricting arm 5711a. Thus, the shock absorber part 571a will prevent the engaging teeth 542 from separating from the thread 460.

Figure 5:
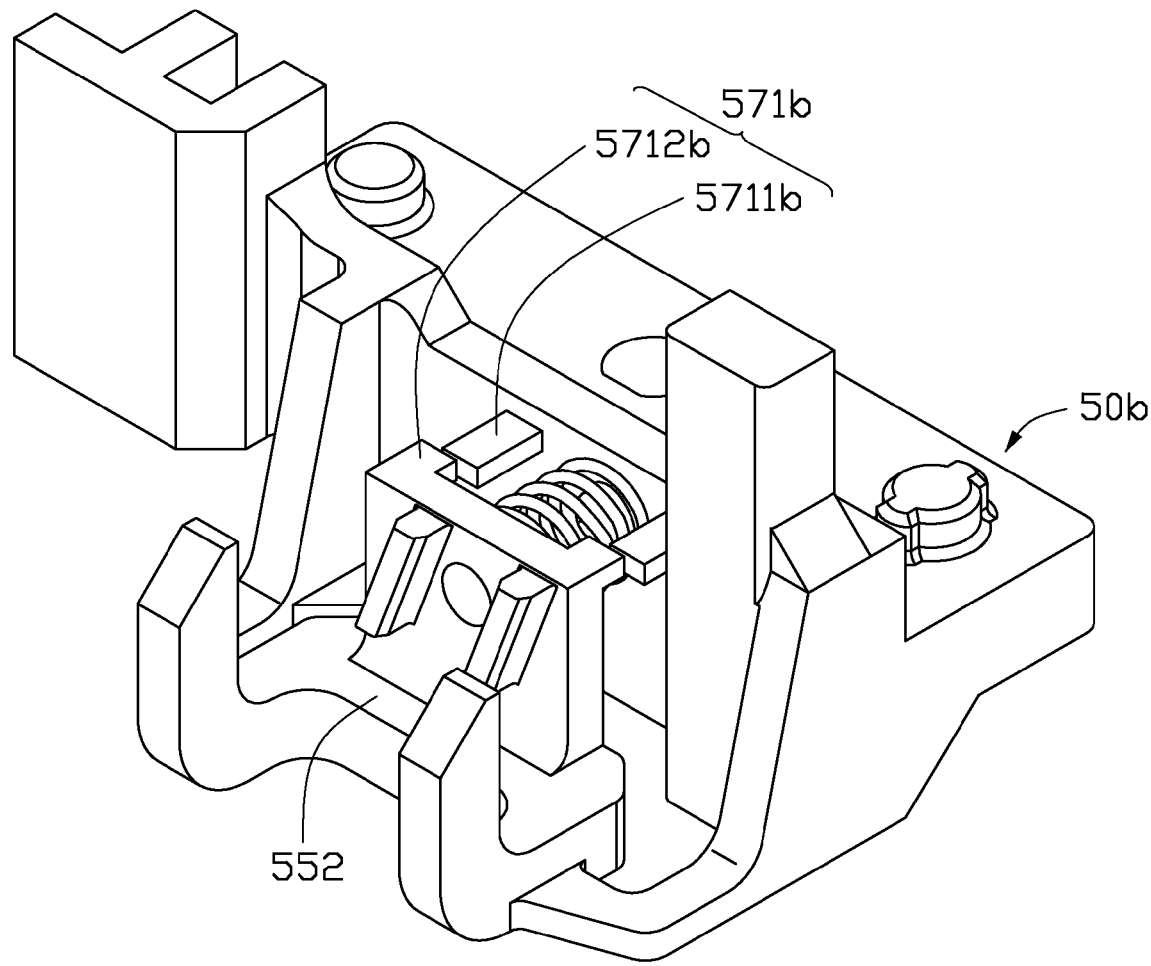
FIG. 5 is an enlarged, inverted isometric view of the rack in accordance with a third embodiment.

Referring to FIG. 5, a third embodiment of a rack 50b is illustrated. Comparing to the rack 50a in FIG. 4, the first restricting arm 5711b and the second restricting arm 5712b of the shock absorber part 571b partially offset each other. The height of the first restricting arm 5711b with respect to the junction member 552 is less than that of the second restricting arm 5712b. When the engaging portion 54 is pushed toward the base plate 522 and deviates to a predetermined distance, the second restricting arm 5712b will collide with the first restricting arm 5711b. Thus, the shock absorber part 571b will prevent the engaging teeth 542 from separating from the thread 460.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical read/write device for reading and/or writing an optical disk, the optical read/write device comprising:
   a base;
   an optical pickup head slidably assembled on the base; and
   a driving mechanism for slidably driving the optical pickup head, the driving mechanism comprising:
   a worm gear;
   a motor connected to the worm gear for rotating the worm gear; and a rack disposed between the worm gear and the optical pickup head for transferring motion from the worm gear to the optical pickup head, the rack comprising:
 a fastening portion for fixing the rack to the optical pickup head;
 an engaging portion;
 a spring placed between the fastening portion and the engaging portion for pressing the engaging portion to engage with the worm gear; and
 a connecting portion for connecting the fastening portion and the engaging portion and preventing the engaging portion from disengaging from the worm gear, the connection portion comprising:
 a resilient member;
 two restricting arms with one ends thereof respectively protruding from the engaging portion and the fastening portion, the other ends thereof connected to each other by the resilient member.

2. The optical read/write device as claimed in claim 1, wherein the engaging portion comprises an assembling plate and at least one engaging tooth protrudes from a side of the assembling plate.

3. The optical read/write device as claimed in claim 2, wherein the two restricting arms protrude from the assembling plate and the fastening portion respectively.

4. The optical read/write device as claimed in claim 1, wherein the resilient member is selected from a group consisting of a U-shaped arm, an M-shaped arm, a V-shaped arm, a W-shaped arm, and a spring.

5. The optical read/write device as claimed in claim 1, wherein the fastening portion comprises a block member protruding along an axis of the worm gear for protecting the optical pickup head.

6. The optical read/write device as claimed in claim 1, wherein the rack further comprises a restricting portion extending from the engaging portion for preventing the engaging portion from disengaging from the worm gear.

7. The optical read/write device as claimed in claim 6, wherein the restricting portion comprises a junction member perpendicularly connected to the engaging portion and a grasping member perpendicularly extending from the junction member.

8. The optical read/write device as claimed in claim 7, wherein the connecting portion further comprises a connecting arm for connecting the fastening portion and the junction member.

9. An apparatus for transferring motion to a device, the apparatus comprising:
 a worm gear;
 a motor connected to the worm gear for rotating the worm gear; and
 a rack disposed between the worm gear and the device for transferring motion from the worm gear to the device, the rack comprising:
 a fastening portion for connecting the device;
 an engaging portion;
 a spring placed between the fastening portion and the engaging portion for pressing the engaging portion to engage with the worm gear; and
 a connecting portion for connecting the fastening portion and the engaging portion and preventing the engaging portion from disengaging from the worm gear, the connection portion comprising:
 a resilient member;
 two restricting arms with one ends thereof respectively protruding from the engaging portion and the fastening portion, the other ends thereof connected to each other by the resilient member.

10. The apparatus as claimed in claim 9, wherein the engaging portion comprises an assembling plate and an engaging tooth disposed on the assembling plate for meshing with a thread of the worm gear.

11. The apparatus as claimed in claim 10, wherein the two restricting arms protrude from the assembling plate and the fastening portion respectively.

12. The apparatus as claimed in claim 9, wherein the rack further comprises a restricting portion comprising a junction member perpendicularly connected to the engaging portion and a grasping member perpendicularly extending from the junction member.

13. The apparatus as claimed in claim 12, wherein the connecting portion further comprises a connecting arm for connecting the fastening portion and the junction member.

* * * * *